US011022206B1

(12) United States Patent
Krebs et al.

(10) Patent No.: US 11,022,206 B1
(45) Date of Patent: Jun. 1, 2021

(54) ANTAGONISTICALLY DRIVEN DIFFERENTIAL FOR MECHANICAL ACTUATOR

(71) Applicant: Massachusetts Institute of Technology, Cambridge, MA (US)

(72) Inventors: Hermano Igo Krebs, Watertown, MA (US); Joseph Ryan Davidson, Watertown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 28 days.

(21) Appl. No.: 16/628,069

(22) PCT Filed: Jun. 8, 2018

(86) PCT No.: PCT/US2018/036592
§ 371 (c)(1),
(2) Date: Jan. 2, 2020

(87) PCT Pub. No.: WO2019/018079
PCT Pub. Date: Jan. 24, 2019

Related U.S. Application Data

(60) Provisional application No. 62/535,204, filed on Jul. 20, 2017, provisional application No. 62/546,868, filed on Aug. 17, 2017.

(51) Int. Cl.
*F16H 48/08* (2006.01)
*F16D 37/02* (2006.01)
(Continued)

(52) U.S. Cl.
CPC ............. *F16H 48/08* (2013.01); *F16D 37/02* (2013.01); *B25J 9/102* (2013.01); *F16D 28/00* (2013.01);
(Continued)

(58) Field of Classification Search
CPC ...... F16D 37/04; F16D 37/007; F16D 37/008; F16D 37/02; F16H 48/22; F16H 1/222
See application file for complete search history.

(56) References Cited

U.S. PATENT DOCUMENTS 2,622,453 A * 12/1952 Garnier .................. F16H 1/222
74/665 S
5,322,484 A   6/1994 Reuter
(Continued)

FOREIGN PATENT DOCUMENTS

DE    102007031734 A1    1/2009
DE    102007042158 A1    3/2009
(Continued)

OTHER PUBLICATIONS

European Patent Office, International Search Report and Written Opinion for PCT/US2018/036592, dated Sep. 6, 2018 (12 pages).
(Continued)

*Primary Examiner* — David R Morris
(74) *Attorney, Agent, or Firm* — Sunstein LLP

(57) ABSTRACT

A mechanical actuator system has variable and controllable mechanical impedance. Such a mechanical actuator system may be used to effectuate a degree of freedom in a robot, i.e., to control speed, output torque and direction of movement of a robotic component, such as a joint, wheel, arm, wrist or grabber. Mechanical impedance, i.e., an amount of "resistance" the robot presents to a human user, can be controlled for safety and rehabilitation purposes. The mechanical actuator system includes a mechanical differential and two adjustable-engagement clutches driven by motor. Advantageously, the motor may turn at a constant speed and direction, yet the mechanical actuator system can be controlled to turn in either direction and at a desired speed. The adjustable-engagement clutches may be electrorheological (ER) fluid clutches, magnetorheological (MR) fluid clutches, con-
(Continued)

ventional dry friction clutches or any other type of clutch whose degrees of engagement can be controlled.

16 Claims, 6 Drawing Sheets

(51) Int. Cl.
  *F16D 37/00* (2006.01)
  *B25J 9/10* (2006.01)
  *F16D 28/00* (2006.01)
(52) U.S. Cl.
  CPC ...... *F16D 37/008* (2013.01); *F16D 2037/001* (2013.01); *F16D 2037/004* (2013.01)

(56) References Cited

U.S. PATENT DOCUMENTS

| | | | |
|---|---|---|---|
| 5,992,582 A | 11/1999 | Lou et al. | |
| 6,585,616 B1* | 7/2003 | Robinson | F16H 48/22 |
| | | | 475/150 |
| 6,942,018 B2 | 9/2005 | Wen et al. | |
| 6,988,602 B2 | 1/2006 | Dolan | |
| 7,549,941 B2 | 6/2009 | Boddy | |
| 8,043,184 B2* | 10/2011 | Boddy | B60W 30/02 |
| | | | 475/88 |
| 8,622,864 B2 | 1/2014 | Fauteux et al. | |
| 9,539,731 B2 | 1/2017 | Shafer et al. | |
| 9,566,715 B2 | 2/2017 | Kermani et al. | |
| 10,179,643 B2* | 1/2019 | Nfonguem | B64C 13/36 |
| 2003/0062149 A1* | 4/2003 | Goodson | F28D 15/00 |
| | | | 165/104.11 |
| 2005/0205375 A1* | 9/2005 | Dolan | B60K 17/35 |
| | | | 192/21.5 |
| 2007/0060436 A1* | 3/2007 | Boddy | F16D 43/28 |
| | | | 475/84 |
| 2009/0233748 A1* | 9/2009 | Boddy | F16D 29/00 |
| | | | 475/88 |
| 2011/0045932 A1* | 2/2011 | Fauteux | B25J 9/102 |
| | | | 475/221 |
| 2013/0047772 A1* | 2/2013 | Shafer | B25J 19/06 |
| | | | 74/490.03 |
| 2015/0107395 A1* | 4/2015 | Kermani | F16D 37/02 |
| | | | 74/490.03 |
| 2016/0355253 A1* | 12/2016 | Nfonguem | F16D 37/02 |

FOREIGN PATENT DOCUMENTS

| | | |
|---|---|---|
| DE | 102008059979 A1 | 6/2010 |
| EP | 0940286 B1 | 7/2004 |
| WO | 2015/114586 | 8/2015 |

OTHER PUBLICATIONS

Neville Hogan, Impedance Control: An Approach to Manipulation, Journal of Dynamic Systems, Measurement, and Control, vol. 107, Jun. 1983, Mar. 1985, pp. 1-24.

P. Fauteux, et al., Dual Differential Rheological Actuator for Robotic Interaction Tasks, 2009 IEEE/ASME International Conference on Advanced Intelligent Mechatronics, Jul. 14, 2009, pp. 47-52.

Kikuchi, et al., Compact MR fluid clutch device for human-friendly actuator, 11th Conference on Electrorheological Fluids and Magnetorheological Suspensions, Journal of Physics: Conference Series 149 (2009) pp. 1-4.

Migliore, et al., Biologically Inspired Joint Stiffness Control, Proceedings of the 2005 IEEE International Conference on Robotics and Automation, Apr. 2005, pp. 4508-4513.

T. Li, F. Zhang, M. Ito, Semi-active Suspension System with Electro-Rheological Damper, Proceedings of the 6th WSEAS International Conference on Circuits, Systems, Communications and Computers, 2002, pp. 6971-6974.

Monkman, Exploitation of Compressive Stress in Electrorheological Coupling, Mechatronics, vol. 7, No. 1, 1997, pp. 27-36.

Heintz, et al, Using a Dual Differential Rheological Actuator as a High-Performance Haptic Interface, The 2010 IEEE/RSJ International Conference on Intelligent Robots and Systems, Oct. 18, 2010, pp, 2519-2520.

* cited by examiner

ANTAGONISTICALLY DRIVEN DIFFERENTIAL FOR MECHANICAL ACTUATOR

CROSS REFERENCE TO RELATED APPLICATIONS

This application is a national stage entry from PCT/US2018/036592, filed Jun. 8, 2018, titled "Antagonistically Driven Differential for Mechanical Actuator," which claims the benefit of U.S. Provisional Patent Application No. 62/535,204, filed Jul. 20, 2017, titled "Antagonistically Driven Differential for Mechanical Actuator," and U.S. Provisional Patent Application No. 62/546,868, filed Aug. 17, 2017, titled "Antagonistically Driven Differential for Mechanical Actuator," the entire contents of each of which are hereby incorporated by reference herein, for all purposes.

TECHNICAL FIELD

The present invention relates to robots and, more particularly, to drive mechanisms/actuators for robot joints.

BACKGROUND ART

Robots are used in many contexts, including automobile assembly lines, prosthetic devices and rehabilitation devices, such as in robot-assisted therapy for upper limb impairments following stroke. Recent studies have shown that robot-assisted therapy for an upper-extremity can be as, or more, effective than conventional therapy in recovering upper-extremity motor function after stroke. However, there is increasing concern that the intensity of post-stroke rehabilitation in a clinic environment using conventional therapy and/or robot-assisted therapy may not be adequate.

Home-based rehabilitation robots can increase accessibility to rehabilitation therapy and potentially provide more intense therapies. To date, the majority of robotic devices for upper limb rehabilitation have been developed for clinic settings. Several technical challenges must be overcome to increase the feasibility of home-based care with robots, including developing systems that are safe, low-cost, easy to use and have footprints, i.e., physical sizes, weights and power requirements, scaled for home use. Reducing the size and complexity of a robot's hardware presents an opportunity to reduce both cost and system footprint.

Mechanical actuators are used to control movements of joints in robots. As such, mechanical actuators control speed and direction of movement of robots or components thereof, such as arms, wrists and grabbers. In some contexts, humans may intentionally or inadvertently come into contact with moving robotic components. For safety reasons, the inertia of these components should be relatively low. Ideally, mechanical impedance, i.e., resistance to change in position, speed and/or direction, of these components, should be adjustable, particularly for robot components with which humans interact for rehabilitation purposes.

Additional background material is available from several sources, including: Benoit Heintz, et al., "Using a Dual Differential Rheological Actuator as a High-Performance Haptic Interface," The 2010 IEEE/RSJ International Conference on Intelligent Robots and Systems, Oct. 18-22, 2010; Shane A. Migliore, et al., "Biologically Inspired Joint Stiffness Control," Proceedings of the 2005 IEEE International Conference on Robotics and Automation, April 2005; T. Kikuchi, et al., "Compact MR fluid clutch device for human-friendly actuator," 11th Conference on Electrorheological Fluids and Magnetorheological Suspensions," Journal of Physics: Conference Series 149, 2009; PCT Publ. No. WO 2009/117827 (now U.S. Pat. No. 8,622,864), Philippe Fauteux, et al., "Dual Differential Semi-Active Actuator Fit for Interaction Tasks and Fast Motion," published Oct. 1, 2009; U.S. Pat. Publ. No. 2015/0107395 (now U.S. Pat. No. 9,566,715), Mehrdad Kermani, et al., "Magneto- and Electro-Rheological Based Actuators for Human Friendly Manipulators," published Apr. 23, 2015; EP 0 940 286 B 1, BorgWarner, Inc., "Magnetorheological clutches for motor vehicle driveline components," published Sep. 8, 1999; and U.S. Pat. Publ. No. 2005/0092570 (now U.S. Pat. No. 6,942,081), Weijia Wen, et al., "Electrorheological Clutch," published May 5, 2005.

SUMMARY OF EMBODIMENTS

An embodiment of the present invention provides a mechanical actuator system for interacting with a mechanical load. The mechanical actuator system includes a first mechanical differential, a source of rotational energy and first and second adjustable-engagement clutches. The first mechanical differential has first and second input ports and an output port. The first and second input ports are each configured to receive respective rotational energy. The output port is configured to output the rotational energy received by the first and second input ports to the mechanical load.

The first adjustable-engagement clutch has an input port and an output port. The input port is coupled to the source of rotational energy for rotation with the source of rotational energy, i.e., the source of rotational energy rotates the input port. The output port is coupled to the first input port of the first mechanical differential for rotating the first input port.

Similarly, the second adjustable-engagement clutch has an input port and an output port. The input port is coupled to the source of rotational energy for rotation with the source of rotational energy, i.e., the source of rotational energy rotates the input port. The output port is coupled to the second input port of the first mechanical differential for rotating the second input port.

The first and second clutches are coupled to the source of rotational energy and to the first mechanical differential so as to simultaneously provide antagonistic rotational energy to the first and second input ports of the first mechanical differential. A mechanical impedance of the output port of the first mechanical differential depends on a sum of: (a) a degree of engagement of the first adjustable-engagement clutch and (b) a degree of engagement of the second adjustable-engagement clutch, i.e., relative degrees to which the first and second adjustable-engagement clutches are engaged.

Optionally, the mechanical actuator system may also include a controller. The controller may be coupled to the first and second adjustable-engagement clutches. The controller may independently automatically control: (a) the degree of engagement of the first adjustable-engagement clutch and (b) the degree of engagement of the second adjustable-engagement clutch, i.e., relative degrees to which the first and second adjustable-engagement clutches are engaged.

Optionally, the controller may be configured to automatically calculate a difference between the degree of engagement of the first adjustable-engagement clutch and the degree of engagement of the second adjustable-engagement clutch, wherein the difference is proportional to a desired output torque of the output port of the first mechanical differential. The controller may be configured to automatically select one of the first and second adjustable-engagement clutches to engage to a greater degree than the other of the first and second adjustable-engagement clutches. The selection may depend on a desired direction of rotation of the output port of the first mechanical differential. The controller may be configured to automatically calculate a sum of the degree of engagement of the first adjustable-engagement clutch and the degree of engagement of the second adjustable-engagement clutch, wherein the sum is proportional to a desired mechanical impedance of the output port of the first mechanical differential.

Optionally, in any given embodiment, the first adjustable-engagement clutch may include a first electrorheological fluid clutch. The second adjustable-engagement clutch may include a second electrorheological fluid clutch.

Optionally, in any given embodiment, the first adjustable-engagement clutch may include a first magnetorheological fluid clutch. The second adjustable-engagement clutch may include a second magnetorheological fluid clutch.

Optionally, in any given embodiment, the first adjustable-engagement clutch may include a first friction clutch, such as a first dry friction clutch. The second adjustable-engagement clutch may include a second friction clutch, such as a second dry friction clutch.

Optionally, in any given embodiment, the source of rotational energy may include an electromagnetic motor.

Optionally, in any given embodiment, the first mechanical differential may include a first bevel gear. The first bevel gear may be coupled to the first input port for rotation with the input port, i.e., the first input port rotates the first bevel gear. The first mechanical differential may also include a second bevel gear. The second bevel gear may be coupled to the second input port for rotation with the second input port, i.e., the second input port rotates the second bevel gear. The first mechanical differential may also include a third bevel gear. The third bevel gear may be engaged with the first and second bevel gears. The third bevel gear may be coupled to the output port for rotating the output port.

Optionally, in any given embodiment, the first mechanical differential may include a first sun gear. The first sun gear may be coupled to the first input port for rotation with the first input port, i.e., the first input port rotates the first sun gear. The first mechanical differential may also include a second sun. The second sun gear may be coupled to the second input port for rotation with the second input port, i.e., the second input port rotates the second sun gear. The first mechanical differential may also include a ring gear. The ring gear may be coupled to the output port for rotating the output port. The first mechanical differential may also include a carrier. The carrier may be coupled to the ring gear for rotation with the ring gear, i.e., the ring gear rotates the coupler. The first mechanical differential may also include a planet gear. The planet gear may be mounted on the carrier. The planet gear may be engaged with the first and second sun gears.

Optionally, in any given embodiment, the first mechanical differential may include an epicyclical differential.

Optionally, in any given embodiment, the first mechanical differential may include a spur-gear differential.

Optionally, in any given embodiment, the mechanical actuator system may also include a linear translator coupled to the output port of the first mechanical differential.

The linear translator may include a lead screw.

Optionally, in any given embodiment, the mechanical actuator system may include a second mechanical differential. The second mechanical differential may have third and fourth input ports and a second output port. The third and fourth input ports each may be configured to receive respective rotational energy. The second output port may be configured to output the rotational energy received by the third and fourth input ports to a second mechanical load.

Optionally, the mechanical actuator system may also include a third adjustable-engagement clutch. The third adjustable-engagement clutch may have an input port and an output port. The input port may be coupled to the source of rotational energy for rotation with the source of rotational energy, i.e., the source of rotational energy rotates the input port. The output port may be coupled to the third input port of the second mechanical differential for rotating the third input port.

Optionally, the mechanical actuator system may also include a fourth adjustable-engagement clutch. The fourth adjustable-engagement clutch may have an input port and an output port. The input port may be coupled to the source of rotational energy for rotation with the source of rotational energy, i.e., the source of rotational energy rotates the input port. The output port may be coupled to the fourth input port of the second mechanical differential for rotating the fourth input port.

The third and fourth clutches may be coupled to the source of rotational energy and to the second mechanical differential so as to simultaneously provide antagonistic rotational energy to the third and fourth input ports of the second mechanical differential. Mechanical impedance of the output port of the second mechanical differential may depend on a sum of: (a) a degree of engagement of the third adjustable-engagement clutch and (b) a degree of engagement of the fourth adjustable-engagement clutch, i.e., relative degrees to which the third and fourth adjustable-engagement clutches are engaged.

Optionally, the mechanical actuator system may also include a controller coupled to the first, second, third and fourth adjustable-engagement clutches. The controller may independently automatically control: (a) the degree of engagement of the first adjustable-engagement clutch, (b) the degree of engagement of the second adjustable-engagement clutch, (c) the degree of engagement of the third adjustable-engagement clutch and (d) the degree of engagement of the fourth adjustable-engagement clutch, i.e., the relative degrees to which the third and fourth adjustable-engagement clutches are engaged.

Optionally, the mechanical actuator system may also include a shaft. The shaft may be coupled to the source of rotational energy for rotation with the source of rotational energy, i.e., the source of rotational energy rotates the shaft. The shaft may be coupled to the input ports of the first, second, third and fourth adjustable-engagement clutches for rotating the respective input ports of the first, second, third and fourth adjustable-engagement clutches. The shaft may extend through respective centers of the first and second input ports of the first mechanical differential. The shaft may also extend through respective centers of the third and fourth input ports of the second mechanical differential.

BRIEF DESCRIPTION OF THE SEVERAL VIEWS OF THE DRAWING

The invention will be more fully understood by referring to the following Detailed Description of Specific Embodiments in conjunction with the Drawings, of which.

DETAILED DESCRIPTION OF SPECIFIC EMBODIMENTS

Figure 1:
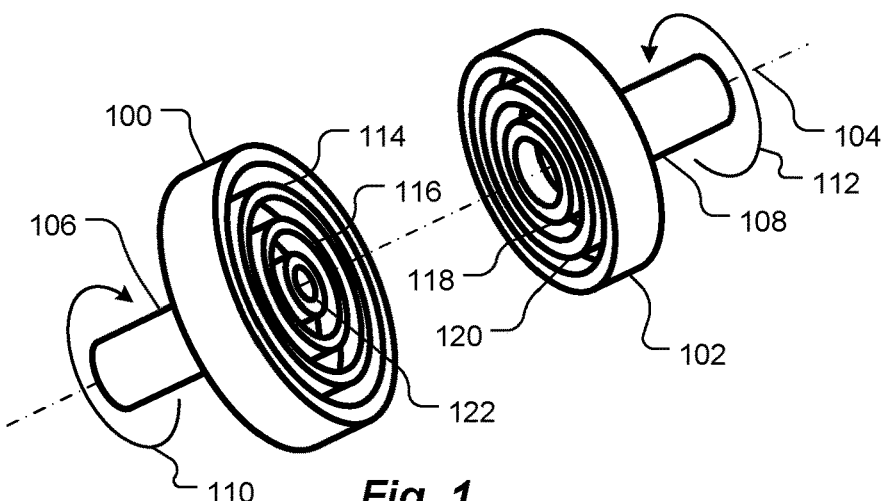
FIGS. 1 and 2 are respective perspective schematic exploded-view illustrations of counterfacing plates of an electrorheological fluid clutch, according to an embodiment of the present invention.

Disclosed herein is a mechanical actuator system that has variable and controllable mechanical impedance. Such a mechanical actuator system may be used to effectuate a degree of freedom in a robot, i.e., to control speed, torque and direction of movement of a robotic component, such as a joint, wheel, arm, wrist or grabber. Furthermore, mechanical impedance, i.e., an amount of "resistance" the robot presents to a human user, can be controlled for safety and rehabilitation purposes, and the mechanical impedance does not depend on the component attached to the mechanical actuator.

The mechanical actuator system includes a mechanical differential and two adjustable-engagement clutches driven by motor. Advantageously, the motor may turn at a constant speed and direction, yet the mechanical actuator system can be controlled to turn in either direction. The adjustable-engagement clutches may be electrorheological (ER) fluid clutches, magnetorheological (MR) fluid clutches, conventional dry friction clutches or any other type of clutch whose degree of engagement can be controlled.

As used herein, the following terms have the following meanings.

A "differential" is a gear train with three shafts, such that the angular velocity of one shaft is the average of the angular velocities of the two other shafts, or a fixed multiple of that average.

A "clutch" is a mechanical device that selectively engages and disengages power transmission, especially from a driving shaft to a driven shaft.

An "adjustable-engagement clutch" is a clutch that can be engaged in a non-binary fashion. Thus, an adjustable-engagement clutch is capable of more than two degrees of engagement, i.e., disengaged and fully (or maximally) engaged. For simplicity of explanation, "fully engaged" means a maximum extent to which a clutch can be engaged. For example, a rheological fluid clutch may slip, i.e., its output shaft may turn slightly slower than its input shaft, or the output shaft may deliver less torque than the input shaft receives, despite the viscosity of the rheological fluid being maximum and the clutch being fully engaged. An adjustable-engagement clutch is not limited to being either disengaged or fully engaged. Instead, an adjustable-engagement clutch can be partially engaged. A degree to which the adjustable-engagement clutch is engaged is controllable to several intermediate values between disengaged and fully engaged. In some embodiments, the degree of engagement can be infinitely adjusted between disengaged and fully engaged. In some embodiments, the degree of engagement is adjustable in discrete steps, for example in 1024 steps, although the steps need not be equal.

Clutches

An electrorheological (ER) fluid is a fluid whose apparent viscosity changes reversibly in response to an electric field. An electrorheological fluid clutch is a clutch that utilizes an electrorheological fluid to selectively transfer force from an input port to an output port. Principles of operation of electrorheological fluid clutches are well known.

Figure 2:
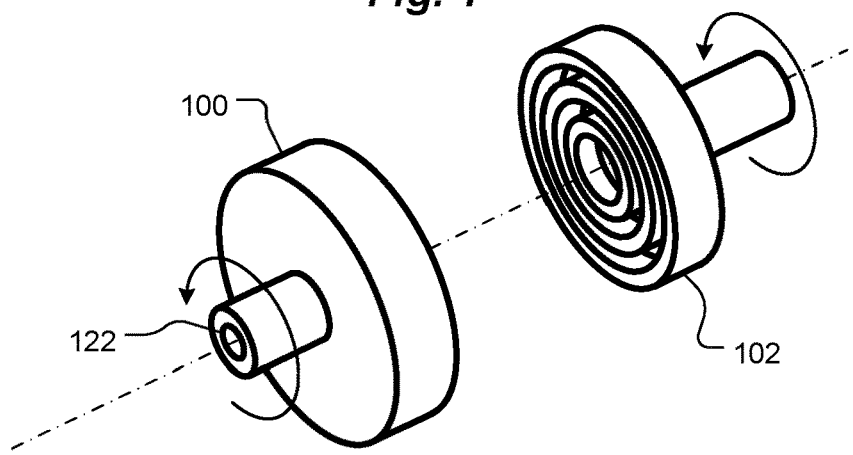

FIGS. 1 and 2 are perspective schematic exploded-view illustrations of counterfacing plates 100 and 102 of an electrorheological fluid clutch, as may be used in embodiments of the present invention. The counterfacing plates 100 and 102 have a common axis of rotation 104. One of the counterfacing plates 100 is mechanically coupled to a shaft 106 that connects to, or acts as, an input port. The other counterfacing plate 102 is mechanically coupled to another shaft 108 that connects to, or acts as, an output port. The input and output ports 106 and 108 are interchangeable. That is, the clutch is symmetric, with respect to input and output. The input and output ports 106 and 108 can rotate, as suggested by arrows 110 and 112, although the input and output ports 106 and 108 can rotate in either direction.

Figure 3:
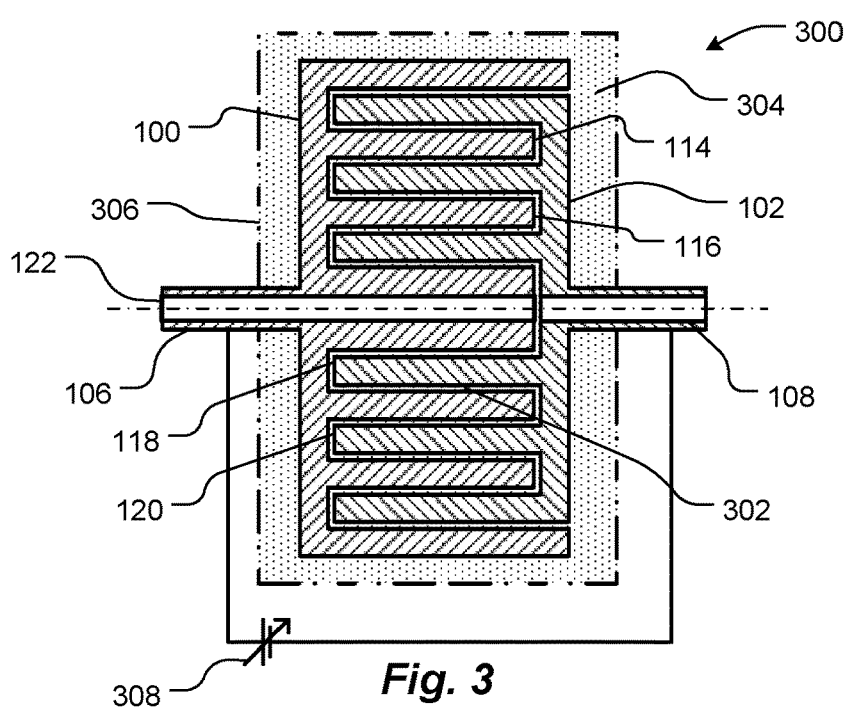
FIG. 3 is a cross-sectional schematic illustration of an electrorheological fluid clutch that includes the counterfacing plates of FIGS. 1 and 2, according to an embodiment of the present invention.

Each plate 100 and 102 includes a plurality of concentric rings, exemplified by rings 114, 116, 118 and 120. FIG. 3 is a cross-sectional schematic illustration of an electrorheological fluid clutch 300 that includes the counterfacing plates 100 and 102. As can be seen in FIG. 3, the rings 114-116 of one counterfacing plate 100 interdigitate (in cross-section) with the rings 118-120 of the other counterfacing plate 102, leaving a small gap, exemplified by gap 302, between counterfacing surfaces of the counterfacing plates 100 and 102. In some embodiments, the gap is about 0.3 mm wide. However, in other embodiments, other appropriate gap sizes may be used.

A suitable electrorheological fluid, represented by dot pattern 304, fills the gap 302 between the two counterfacing plates 100 and 102, in particular between the rings 114-120. The electrorheological fluid 304 is contained within a housing 306. The electrorheological clutch 300 includes appropriate seals and bearings, which are omitted from the drawings for clarity.

A variable voltage source 308 is electrically connected across the two counterfacing plates 100 and 102, thereby generating an electric field to influence the electrorheological fluid 304. Varying the voltage of the voltage source 308 causes the viscosity of the electrorheological fluid 304 to vary, which varies a degree to which the input shaft 106 is mechanically coupled to the output shaft 108 by frictional drag between the electrorheological fluid 304 and the two counterfacing plates 100 and 102. The electrorheological fluid clutch 300 is an example of an adjustable-engagement clutch.

A central bore 122 is defined through the two counterfacing plates 100 and 102 and through the input and output shafts 106 and 108. The central bore 122 permits a drive shaft (not shown), whose outside diameter is smaller than the inside diameter of the central bore 122, to extend through, and rotate independently of, the electrorheological clutch 300, as discussed herein.

A magnetorheological (MR) fluid is a fluid whose apparent viscosity changes reversibly in response to a magnetic field. A magnetorheological fluid clutch operates much as the electrorheological fluid clutch 300, except the electric field is replaced by a magnetic field (not shown), such as a magnetic field generated by an electric current flowing through a coil (not shown).

Mechanical Actuator System

Figure 4:
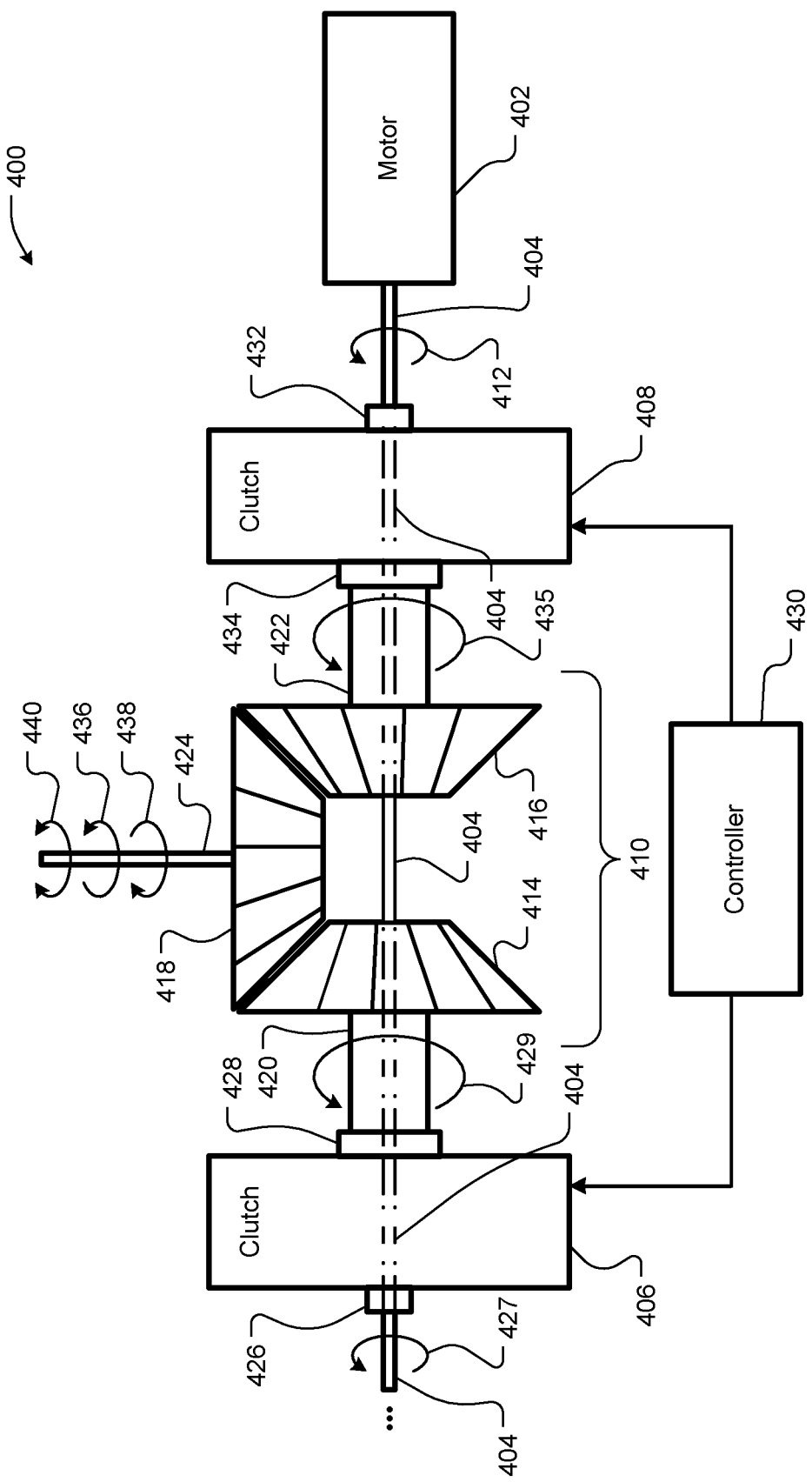
FIG. 4 is a schematic diagram of a mechanical actuator system, according to an embodiment of the present invention.

FIG. 4 is a schematic diagram of a mechanical actuator system 400, according to an embodiment of the present invention. The mechanical actuator system 400 may be used to drive a mechanical load, such as a wheel, wrist or other joint of a robot. The mechanical actuator system 400 includes a motor 402, a drive shaft 404, two adjustable-engagement clutches 406 and 408 and a differential gear train 410. Each adjustable-engagement clutch 406 and 408 may be an electrorheological fluid clutch, a magnetorheological fluid clutch, a dry friction clutch or any other suitable adjustable-engagement clutch.

The motor 402 may be an electromagnetic motor or any other suitable motor. The motor 402 turns the drive shaft 404 in a direction indicated by an arrow 412, although the direction is arbitrary. In other words, the motor 402 may turn the shaft 404 in either direction, although the direction need not, and should not, change. The shaft 404 extends through the system 400, as shown by dash lines, and the shaft 404 may extend further to drive additional mechanical actuator systems (not shown), as indicated by ellipses at the left side of the drawing, and as discussed herein. Thus, either the motor 402 or the drive shaft 404 may be considered to be a source of rotational energy.

The differential gear train 410 includes three bevel gears 414, 416 and 418. The first bevel gear 414 is mechanically coupled to a first input port 420 of the differential gear train 410, and the second bevel gear 416 is mechanically coupled to a second input port 422 of the differential gear train 410. The third bevel gear 418 is engaged with the first and second bevel gears 414 and 416. The third bevel gear 418 is also mechanically coupled to an output port 424 of the differential gear train 410.

The two input ports 420 and 422 may include hollow shafts with inside diameters larger than the outside diameter of the drive shaft 404 to permit the drive shaft 404 to extend through the two input ports 420 and 422 and to turn within the two input ports 420 and 422, without contacting, i.e., independently of, the input ports 420 and 422. Similarly, the first and second bevel gears 414 and 416 may define central apertures through which the drive shaft 404 extends. The central apertures are larger in inside diameter than the outside diameter of the drive shaft 404.

Figure 8:
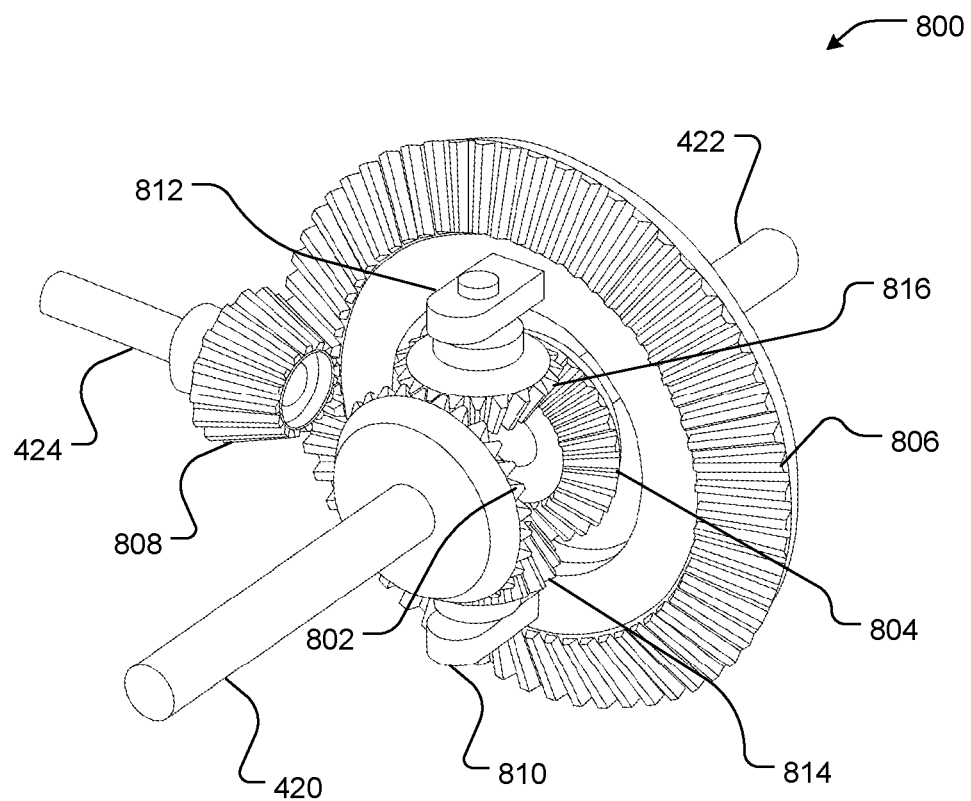
FIG. 8 is a perspective illustration of one type of differential gear train, according to the prior art.

In other embodiments, the differential gear train 410 may include another well-known differential implementation. For example, FIG. 8 is a perspective illustration of one type of well-known differential gear train 800. The differential gear train 800 includes a first sun gear 802 coupled to the first input port 420 for rotation therewith, i.e., the first input port 420 rotates the first sun gear 802. The differential gear train 800 also includes a second sun gear 804 coupled to the second input port 422 for rotation therewith, i.e., the second input port 422 rotates the second sun gear 804. A ring gear 806 is coupled to the output port 424 via a pinion gear 808 for rotating the output port 424. Two carriers 810 and 812 are coupled to the ring gear 806 for rotation therewith, i.e., the ring gear 806 rotates the two carriers 810 and 812. Two planet gears 814 and 816 are respectively mounted on the carriers 810 and 812. The two planet gears 814 and 816 engage with the first and second sun gears 802 and 804.

Other examples of differential gear trains include epicyclical differentials (not shown) and spur-gear differentials (not shown).

Returning to the embodiment illustrated in FIG. 4, the first adjustable-engagement clutch 406 has an input port 426 mechanically coupled to the drive shaft 404. Thus, the drive shaft 404 rotates the input port 426 of the first adjustable-engagement clutch 406 in a direction indicated by an arrow 427. The first adjustable-engagement clutch 406 has an output port 428 mechanically coupled to the first input port 420 of the differential gear train 410.

A controller 430 is coupled to the first adjustable-engagement clutch 406 to control a degree to which the first adjustable-engagement clutch 406 is engaged. For example, if the first adjustable-engagement clutch 406 is an electrorheological fluid clutch, the controller 430 may vary a voltage of an electric field within the adjustable-engagement clutch 406 and, thereby, the controller 430 may vary the viscosity of the electrorheological fluid and, therefore, a degree of mechanical engagement between the input port 426 and the output port 428, as discussed with respect to FIGS. 1-3.

If the first adjustable-engagement clutch 406 is partially or fully engaged, the output port 428 is driven, or at least urged to turn, in a direction indicated by an arrow 429. The degree to which the first adjustable-engagement clutch 406 is engaged influences the speed of, and amount of torque transferred to, the first input port 420 of the differential gear train 410.

However, if the first adjustable-engagement clutch 406 is disengaged, the output port 428 is free. That is, the output port 428 may remain still or the output port 428 may rotate in either direction, depending on rotation of the first input port 420 of the differential gear train 410. In other words, if the first adjustable-engagement clutch 406 is disengaged, the first input port 420 of the differential gear train 410 may back-drive the output port 428 of the first adjustable-engagement clutch 406.

Similarly, the second adjustable-engagement clutch 408 has an input port 432 mechanically coupled to the drive shaft 404. Thus, the drive shaft 404 rotates the input port 432 of the second adjustable-engagement clutch 408 in a direction indicated by the arrow 412. The second adjustable-engagement clutch 408 has an output port 434 mechanically coupled to the second input port 422 of the differential gear train 410.

The controller 430 is also coupled to the second adjustable-engagement clutch 408 to control a degree to which the second adjustable-engagement clutch 408 is engaged. If the second adjustable-engagement clutch 408 is partially or fully engaged, the output port 434 is driven, or at least urged to turn, in a direction indicated by an arrow 435. The degree to which the second adjustable-engagement clutch 408 is engaged influences the speed of, and amount of torque transferred to, the second input port 422 of the differential gear train 410.

However, if the second adjustable-engagement clutch 408 is disengaged, the output port 434 is free. That is, the output port 434 may remain still or the output port 434 may rotate in either direction, depending on rotation of the second input port 422 of the differential gear train 410. In other words, if the second adjustable-engagement clutch 408 is disengaged, the second input port 422 of the differential gear train 410 may back-drive the output port 434 of the second adjustable-engagement clutch 408.

The controller 430 independently controls the degrees of the engagements by the two adjustable-engagement clutches 406 and 408. That is, the two adjustable-engagement clutches 406 and 408 need not be equally engaged. As noted, if the first adjustable-engagement clutch 406 is disengaged, the first input port 420 of the differential gear train 410 may back-drive the output port 428 of the first adjustable-engagement clutch 406. In this case, rotation of the output port 424 of the differential gear train 410 is controlled solely by the second input port 422 of the differential gear train 410 which, in turn, is driven by the second adjustable-engagement clutch 408. Therefore, the output port 424 rotates in a direction indicated by an arrow 436.

On the other hand, if the second adjustable-engagement clutch 408 is disengaged, the second input port 422 of the differential gear train 410 may back-drive the output port 434 of the second adjustable-engagement clutch 408. In this case, the rotation of the output port 424 of the differential gear train 410 is controlled solely by the first input port 420 of the differential gear train 410 which, in turn, is driven by the first adjustable-engagement clutch 406. Therefore, the output port 424 rotates in a direction indicated by an arrow 438, which is opposite the direction of the arrow 436. Thus, selectively engaging one of the two adjustable-engagement clutches 406 or 408 controls the direction of rotation of the output port 424. Consequently, the output port 424 can be selectively rotated in either direction, as indicated by a two-headed arrow 440.

Engaging both of the two adjustable-engagement clutches 406 and 408 simultaneously provides opposing ("antagonistic") drives to the two input ports 420 and 422, respectively, of the differential gear train 410. Output torque, and to an extent rotational speed, of the output port 424 of the differential gear train 410 depends on relative degrees to which the first and second adjustable-engagement clutches 406 and 408 are engaged. Because the two input ports 420 and 422 of the differential gear train 410 drive the output port 424 in opposite directions 436 and 438, the more equally the two adjustable-engagement clutches 406 and 408 are engaged, the lower the output torque and, generally, the slower the output port 424 turns. If the two adjustable-engagement clutches 406 and 408 are equally engaged, the output torque is zero and the output port 424 does not turn at all, at least not as a result of drive from the motor 402. Conversely, the greater the difference in the degrees to which the two adjustable-engagement clutches 406 and 408 are engaged, the higher the output torque, and generally the faster the output port 424 turns. The output torque is proportional to the difference in the degrees to which the two adjustable-engagement clutches 406 and 408 are engaged. The speed of the output port 424 depends on the output torque and what is attached to the output port 424. For example, acceleration of a wheel attached to the output port 424 depends on the output torque and moment of inertia of the wheel, and speed of the wheel depends on the acceleration and length of time the wheel is accelerated, according to well-known formulas.

The direction 436 or 438 in which the output port 424 turns depends on which of the two adjustable-engagement clutches 406 and 408 is more engaged, i.e., engaged to a greater degree. If the first adjustable-engagement clutch 406 is engaged to a greater degree than the second adjustable-engagement clutch 408 is engaged, the output port 424 turns in the direction of the arrow 438. However, if the second adjustable-engagement clutch 408 is engaged to a greater degree than the first adjustable-engagement clutch 406 is engaged, the output port 424 turns in the direction of the arrow 436.

Conceptually, the input and output ports of a clutch can be swapped, without affecting operation of the clutch, because the clutch merely controls an extent to which the two ports are mechanically coupled to each other. Thus, a clutch transfers torque both from its input port to its output port, and from its output port to its input port. Furthermore, for any given degree of engagement, the amount of forward torque transfer and the amount of reverse torque transfer are equal.

Thus, the degree of engagement of either adjustable-engagement clutch 406 or 408 controls both: (1) forward torque transfer, i.e., torque transfer from the input port 426 or 432 to the output port 428 or 434, and (2) backward torque transfer, i.e., torque transfer from the output port 428 or 434 to the input port 426 or 432. For each adjustable-engagement clutch 406 or 408, at any given time, the degrees of forward and backward torque transfer are equal.

Mechanical impedance of the output port 424 depends on the sum of the degrees to which the two adjustable-engagement clutches 406 and 408 are engaged. Most running conventional electromagnetic motors resist acceleration and deceleration by external forces, thereby exhibiting mechanical impedance. To the extent each adjustable-engagement clutch 406 or 408 is engaged, the adjustable-engagement clutch 406 or 408 transfers the mechanical impedance of the motor 402 to the respective input port 420 or 422 of the differential gear train 410. The differential gear train 410 transfers mechanical impedance from its two input ports 420 and 422 to its output port 424. Thus, the total mechanical impedance of the output port 424 of the differential gear train 410 is proportional to a sum of the degrees to which the two adjustable-engagement clutches 406 and 408 are engaged.

Controller

Figure 5:
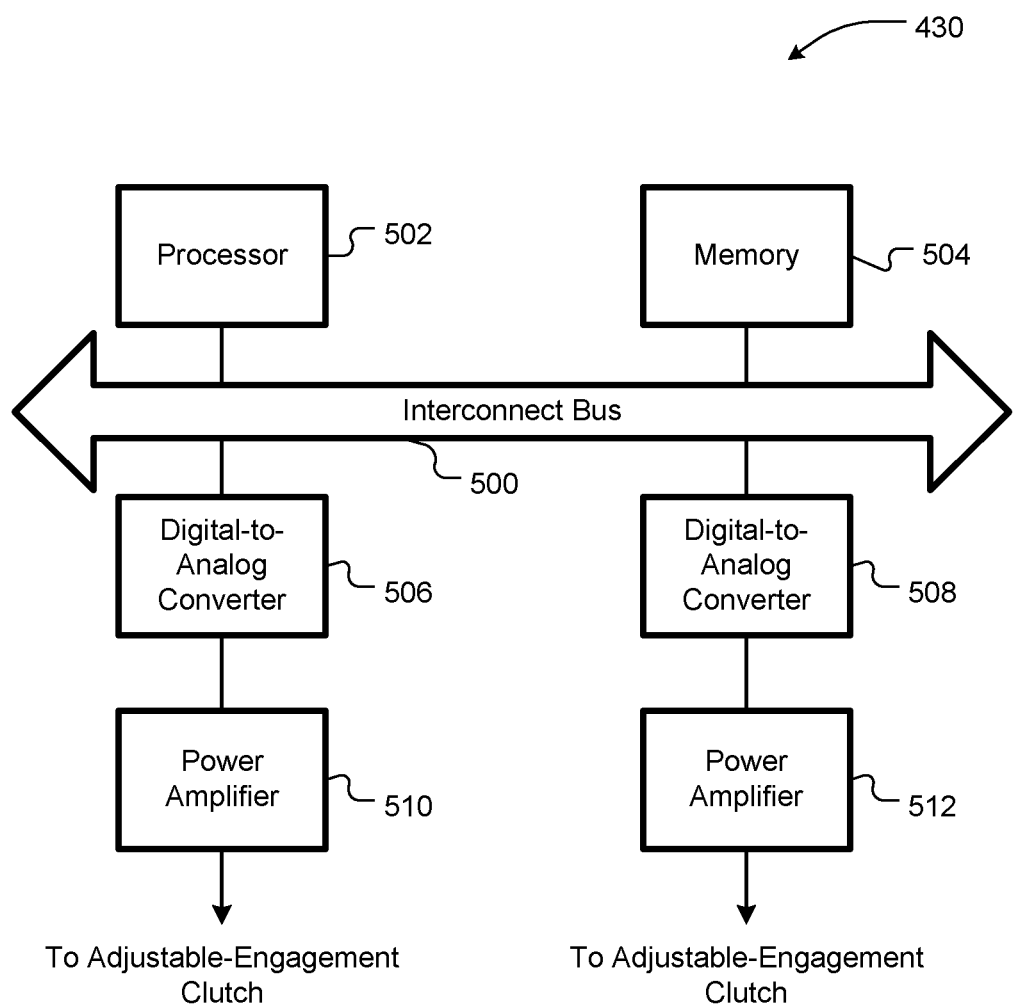
FIG. 5 is a schematic block diagram of a controller of the mechanical actuator system of FIG. 4, according to an embodiment of the present invention.

The controller 430 may be implemented by a processor executing instructions stored in a memory. FIG. 5 is a schematic block diagram of the controller 430, according to an embodiment of the present invention. An interconnect bus 500 electronically interconnects a processor 502, a memory 504 and two digital-to-analog converters (DACs) 506 and 508. Each digital-to-analog converter 506 and 508 is electronically coupled to a respective power amplifier 510 and 512.

The processor 502 executes instructions stored in the memory 504. The instructions include instructions to calculate appropriate voltages or currents to be applied to the two adjustable-engagement clutches 406 and 408 (FIG. 4). The instructions also include instructions to cause the digital-to-analog converters 506 and 508 to generate signals, such as voltages, proportional to voltages or currents to be applied to the two adjustable-engagement clutches 406 and 408. The power amplifiers 510 and 512 amplify respective signals from the digital-to-analog converters 506 and 508 sufficiently to drive the adjustable-engagement clutches 406 and 408, for example, sufficiently to alter the viscosity of electrorheological fluid in the adjustable-engagement clutches 406 and 408 to alter the amount of torque transferred by the adjustable-engagement clutches 406 and 408.

Figure 6:
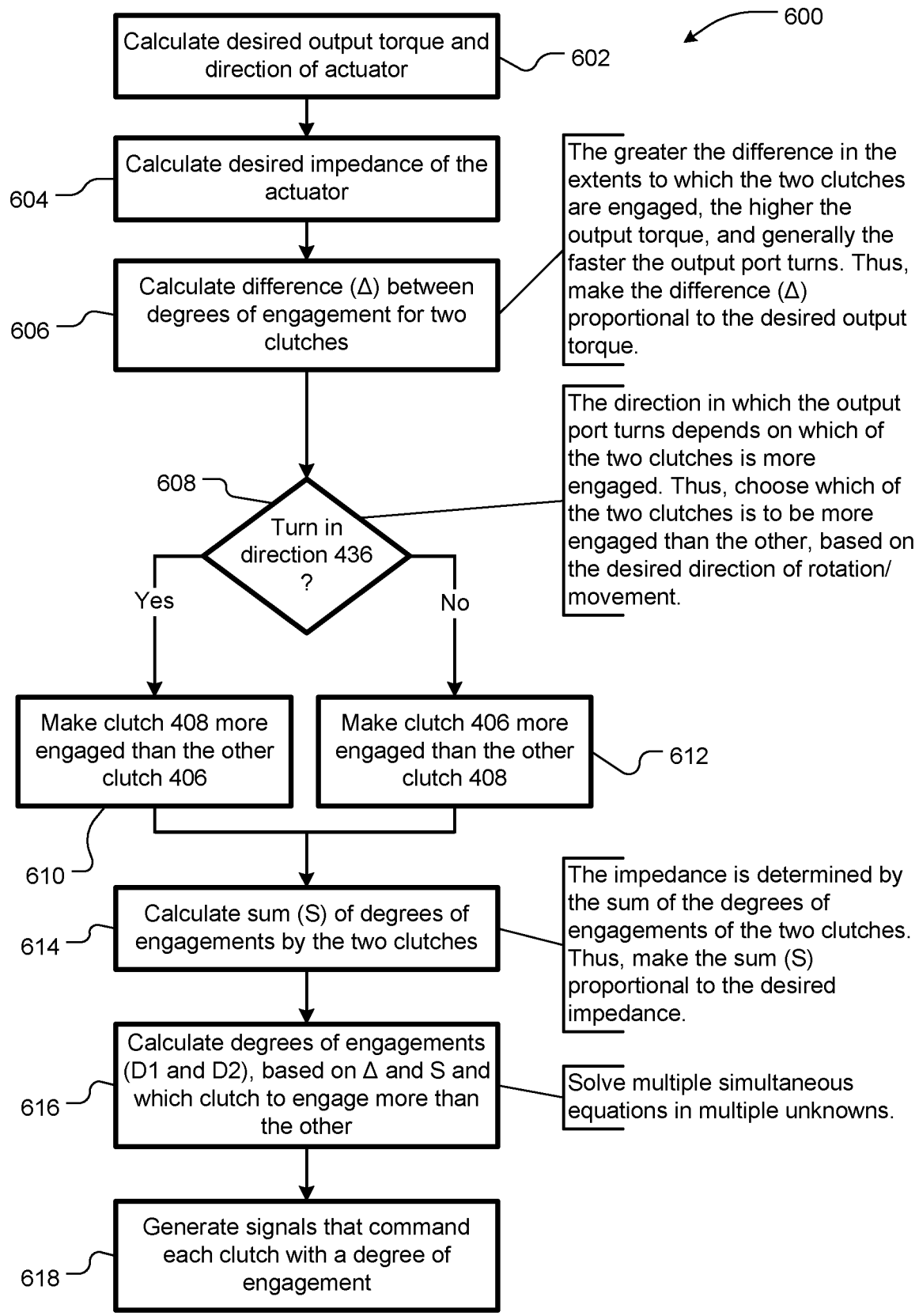
FIG. 6 is a schematic flowchart summarizing operations performed by a processor of the controller of FIG. 5.

FIG. 6 is a schematic flowchart 600 summarizing operation performed by the processor 502, such as by executing instructions. Operation 602 calculates a desired output torque and direction of rotation/movement of the actuator.

Operation 604 calculates a desired impedance of the actuator. The output torque, direction and impedance depend, of course, on the function of the robot and are, therefore, application specific and, consequently, beyond the scope of this document.

Once the desired output torque, direction and impedance have been calculated, parameters for the two antagonistically driven adjustable-engagement clutches 406 and 408 (FIG. 4) may be calculated by operations 606-616. The parameters include: (1) a difference (Δ) between the degrees of engagement for the two adjustable-engagement clutches 406 and 408; (2) which of the two adjustable-engagement clutches 406 and 408 is to be more engaged than the other; and (3) a sum (S) of the degrees of engagements of the two adjustable-engagement clutches 406 and 408. These parameters, and possibly other parameters, such as the speed, available torque and direction of rotation of the drive shaft 404 and the impedance of the motor 402, are then used to calculate degrees of engagements for the two adjustable-engagement clutches 406 and 408. Then, operation 618 may generate signals to set the degrees of engagements for the adjustable-engagement clutches 406 and 408. Operations 608-618 are described in more detail below.

Operation 606 calculates the difference (A) between the degrees of engagement for the two adjustable-engagement clutches 406 and 408. As noted, the greater the difference in the degrees to which the two clutches are engaged, the higher the output torque, and generally the faster the output port 424 turns. Thus, operation 606 calculates a difference (A) that is proportional to the desired output torque. As noted, the speed of the output port 424 depends on the output torque and characteristics of an item attached to the output port, including the moment of inertia of the item and the length of time the item is accelerated.

Operation 608 determines in which direction the rotation/movement is to occur. If the rotation/movement requires the output of the differential gear train 410 to be in the direction of the arrow 436, control passes to operation 610 (the second adjustable-engagement clutch 408 is to be engaged more than the other adjustable-engagement clutch 406), otherwise control passes to operation 612 (the first adjustable-engagement clutch 406 is to be engaged more than the other adjustable-engagement clutch 408).

Operation 614 calculates a sum (S) of the degrees of engagement by the two adjustable-engagement clutches 406 and 408. As noted, the impedance of the output port 424 is proportional to the sum of the degrees of engagements of the two adjustable-engagement clutches 406 and 408. Thus, operation 614 calculates a sum (S) that is proportional to the desired impedance.

Once the parameters have been determined, operation 616 essentially solves multiple simultaneous equations in multiple unknowns to calculate degrees of engagement (D1 and D2, respectively) for the two adjustable-engagement clutches 406 and 408. Operation 618 commands the digital-to-analog converters 506 and 508 (FIG. 5) to generate signals according to the calculated values of D1 and D2. After amplification by the power amplifiers 510 and 512, respectively, the signals are fed to the two adjustable-engagement clutches 406 and 408 to control their respective degrees of engagement.

Multiple Degree-of-Freedom (DOF) Mechanical Actuator System

The mechanical actuator system 400, described with respect to FIG. 4, may be used to control a single degree of freedom (DOF) of a robot, such as wrist rotation. A plurality of mechanical actuator systems may be connected together by a common drive shaft to provide a plurality of degrees of freedom, such as shoulder rotation, elbow rotation and wrist rotation, all powered by a single motor turning in an unchanging direction.

Figure 7:
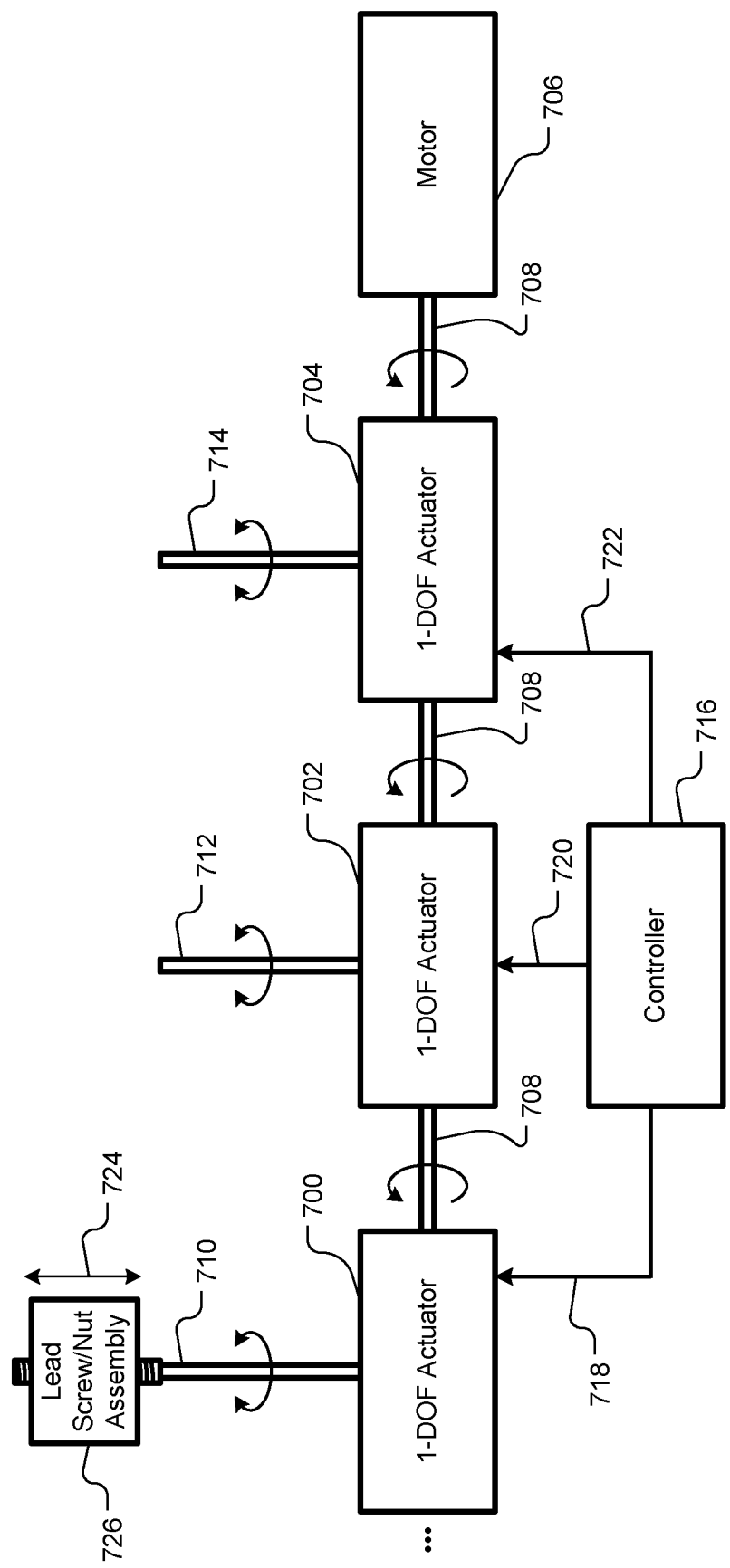
FIG. 7 is a schematic diagram illustrating three mechanical actuator systems (each referred to as a one-degree-of-freedom (DOF) actuator), driven by a single motor, according to an embodiment of the present invention.

FIG. 7 is a schematic diagram illustrating three mechanical actuator systems 700, 702 and 704, each referred to as a one-degree-of-freedom (DOF) actuator, all driven by a single motor 706, according to an embodiment of the present invention. A drive shaft 708 extends from the motor 706 to and through the mechanical actuator systems 700-704. Although three mechanical actuator systems 700-704 are shown, other numbers of mechanical actuator system may be similarly connected together and to the common drive shaft 708 and motor 706.

Each of the mechanical actuator systems 700-704 may be implemented by a copy of the mechanical actuator system 400 described with respect to FIG. 4. The drive shaft 708 in FIG. 7 corresponds to the drive shaft 404 in FIG. 4. Each mechanical actuator system 700-704 has a respective output port 710, 712, or 714, which corresponds to the output port 424 in FIG. 4. Each of the mechanical actuator systems 700-704 may have its own controller (not shown), or a common controller 716 may control all the mechanical actuator systems 700-704. Although one control line 718, 720 and 722, respectively, is shown extending from the common controller 716 to each mechanical actuator system 700-704, each control line 718-722 carries signals to control both adjustable-engagement clutches (not visible) in each mechanical actuator system 700-704. The common controller 716 controls each of the mechanical actuator systems 700-704 as described with respect to FIGS. 4-6.

Optionally, one or more of the mechanical actuator systems 700-704 may be mechanically coupled to respective linear translators to convert rotary output of the respective mechanical actuator system 700-704 into linear motion, as exemplified by an arrow 724. As an example of a linear translator, a lead screw and nut assembly 726 is shown coupled to the mechanical actuator system 700. However, other suitable linear translators, such as rack and pinion gear assemblies and Scotch yokes (also known as slotted link mechanisms) may be used.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A mechanical actuator system for interacting with a mechanical load, the system comprising:
    a first mechanical differential having first and second input ports and an output port, the first and second input ports each being configured to receive respective rotational energy and the output port being configured to output the rotational energy received by the first and second input ports to the mechanical load;
    a source of rotational energy;
    a first adjustable-engagement clutch having an input port and an output port, the input port being coupled to the source of rotational energy for rotation therewith and the output port being coupled to the first input port of the first mechanical differential for rotating the first input port; and
    a second adjustable-engagement clutch having an input port and an output port, the input port being coupled to the source of rotational energy for rotation therewith and the output port being coupled to the second input port of the first mechanical differential for rotating the second input port;
    wherein the first and second clutches are coupled to the source of rotational energy and to the first mechanical differential so as to simultaneously provide antagonistic rotational energy to the first and second input ports of the first mechanical differential, and mechanical impedance of the output port of the first mechanical differential depends on a sum of: (a) a degree of engagement of the first adjustable-engagement clutch and (b) a degree of engagement of the second adjustable-engagement clutch.

2. A mechanical actuator system according to claim 1, further comprising a controller coupled to the first and second adjustable-engagement clutches and configured to independently automatically control: (a) the degree of engagement of the first adjustable-engagement clutch and (b) the degree of engagement of the second adjustable-engagement clutch, so as to simultaneously provide antagonistic rotational energy to the first and second input ports of the first mechanical differential.

3. A mechanical actuator system according to claim 2, wherein the controller is configured to automatically:
    calculate a difference between the degree of engagement of the first adjustable-engagement clutch and the degree of engagement of the second adjustable-engagement clutch, wherein the difference is proportional to a desired output torque of the output port of the first mechanical differential;
    select one adjustable-engagement clutch of the first and the second adjustable-engagement clutches to engage to a greater degree than the other of the first and the second adjustable-engagement clutches, depending on a desired direction of rotation of the output port of the first mechanical differential; and
    calculate a sum of the degree of engagement of the first adjustable-engagement clutch and the degree of engagement of the second adjustable-engagement clutch, wherein the sum is proportional to a desired mechanical impedance of the output port of the first mechanical differential.

4. A mechanical actuator system according to claim 1, wherein:
    the first adjustable-engagement clutch comprises a first electrorheological fluid clutch; and
    the second adjustable-engagement clutch comprises a second electrorheological fluid clutch.

5. A mechanical actuator system according to claim 1, wherein:
    the first adjustable-engagement clutch comprises a first magnetorheological fluid clutch; and
    the second adjustable-engagement clutch comprises a second magnetorheological fluid clutch.

6. A mechanical actuator system according to claim 1, wherein:
    the first adjustable-engagement clutch comprises a first friction clutch; and
    the second adjustable-engagement clutch comprises a second friction clutch.

7. A mechanical actuator system according to claim 1, wherein the source of rotational energy comprises an electromagnetic motor.

8. A mechanical actuator system according to claim 1, wherein the first mechanical differential comprises:
    a first bevel gear coupled to the first input port for rotation therewith;
    a second bevel gear coupled to the second input port for rotation therewith; and
    a third bevel gear engaged with the first and second bevel gears and coupled to the output port for rotating the output port.

9. A mechanical actuator system according to claim 1, wherein the first mechanical differential comprises:
    a first sun gear coupled to the first input port for rotation therewith;
    a second sun gear coupled to the second input port for rotation therewith;
    a ring gear coupled to the output port for rotating the output port;

a carrier coupled to the ring gear for rotation therewith; and a planet gear mounted on the carrier and engaged with the first and second sun gears.

10. A mechanical actuator system according to claim 1, wherein the first mechanical differential comprises an epicyclical differential.

11. A mechanical actuator system according to claim 1, wherein the first mechanical differential comprises a spur-gear differential.

12. A mechanical actuator system according to claim 1, further comprising a linear translator coupled to the output port of the first mechanical differential.

13. A mechanical actuator system according to claim 12, wherein the linear translator comprises a lead screw.

14. A mechanical actuator system according to claim 1, further comprising:
- a second mechanical differential having third and fourth input ports and a second output port, the third and fourth input ports each being configured to receive respective rotational energy and the second output port being configured to output the rotational energy received by the third and fourth input ports to a second mechanical load;
- a third adjustable-engagement clutch having an input port and an output port, the input port being coupled to the source of rotational energy for rotation therewith and the output port being coupled to the third input port of the second mechanical differential for rotating the third input port; and
- a fourth adjustable-engagement clutch having an input port and an output port, the input port being coupled to the source of rotational energy for rotation therewith and the output port being coupled to the fourth input port of the second mechanical differential for rotating the fourth input port;

wherein the third and fourth clutches are coupled to the source of rotational energy and to the second mechanical differential so as to simultaneously provide antagonistic rotational energy to the third and fourth input ports of the second mechanical differential, and mechanical impedance of the output port of the second mechanical differential depends on a sum of: (a) a degree of engagement of the third adjustable-engagement clutch and (b) a degree of engagement of the fourth adjustable-engagement clutch.

15. A mechanical actuator system according to claim 14, further comprising a controller coupled to the first, second, third and fourth adjustable-engagement clutches and configured to independently automatically control: (a) the degree of engagement of the first adjustable-engagement clutch, (b) the degree of engagement of the second adjustable-engagement clutch, (c) the degree of engagement of the third adjustable-engagement clutch and (d) the degree of engagement of the fourth adjustable-engagement clutch, so as to simultaneously provide antagonistic rotational energy to the first and second input ports of the first mechanical differential, and so as to simultaneously provide antagonistic rotational energy to the third and fourth input ports of the second mechanical differential.

16. A mechanical actuator system according to claim 14, further comprising a shaft coupled to the source of rotational energy for rotation therewith, the shaft being coupled to the input ports of the first, second, third and fourth adjustable-engagement clutches for rotating the respective input ports of the first, second, third and fourth adjustable-engagement clutches, the shaft extending through respective centers of the first and second input ports of the first mechanical differential and through respective centers of the third and fourth input ports of the second mechanical differential.

\* \* \* \* \*